Oct. 18, 1966  J. SACKL  3,279,271
BELT PULLEY WITH INFINITELY VARIABLE DIAMETER
Filed Aug. 11, 1964

INVENTOR.
Johann Sackl
BY Ernest Montague
Attorney

United States Patent Office 3,279,271
Patented Oct. 18, 1966

1

3,279,271
BELT PULLEY WITH INFINITELY
VARIABLE DIAMETER
Johann Sackl, Kowald 127,
Voitsberg, Steiermark, Austria
Filed Aug. 11, 1964, Ser. No. 388,796
Claims priority, application Austria, Aug. 22, 1963,
2A 6,727/63
4 Claims. (Cl. 74—230.23)

The present invention relates to a belt pulley of infinitely variable diameter, in general, and to a V-belt pulley of infinitely variable diameter, in particular, intended for and suitable for a continuously variable V-belt drive.

It is one object of the present invention to provide a belt pulley with infinitely variable diameter, wherein upon simple rotation of one element of the pulley an increase or decrease of the effective diameter of the pulley can be brought about.

It is another object of the present invention to provide a belt pulley with infinitely variable diameter, which is of simple structure and which comprises a few easily manufacturable parts and thus is economical in its manufacture.

It is yet another object of the present invention to provide a belt pulley with infinitely variable diameter, wherein the elements receiving the belts do not require precise construction, in view of resilient members compensating for the inexactness.

It is yet another object of the present invention to provide a belt pulley with infinitely variable diameter, which comprises a hub on which two axially spaced discs are mounted and a plurality of segments adapted to be clamped between the discs, such that their outer surfaces define the base of the pulley groove, the segments being radially slidable relative to the discs and threadably engaging one of the discs, whereby rotation of the one disc causes simultaneous radial movement of the segments and thus adjustment of the diameter of the pulley groove.

Figure 1:
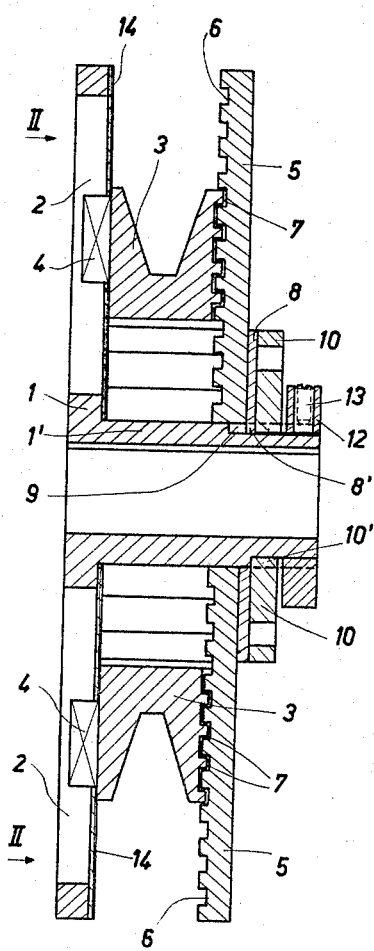
Figure 2:
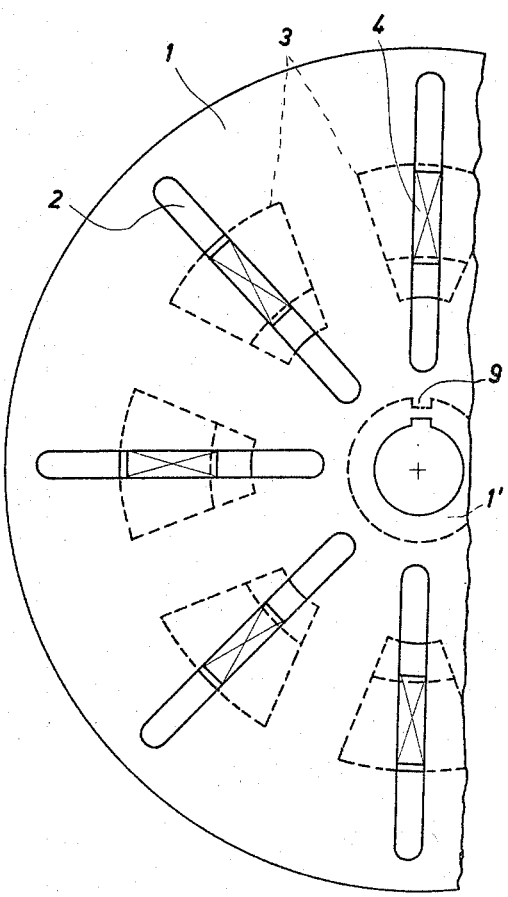

With these and other objects in view, which will become apparent in the following detailed description, the present invention will be clearly understood in connection with the accompanying drawings, in which:

FIGURE 1 is an axial cross-section through a pulley in accordance with the present invention; and FIG. 2 is an end view of the pulley disclosed in FIG. 1 as seen from the left of FIG. 1.

Referring now to the drawings, the grooved pulley comprises a hub 1' and two axially spaced discs 1 and 5. The disc 1 is integral with the hub 1' and the disc 5 is slidably mounted on the hub 1'. Clamped between the discs 1 and 5 are a plurality of, for example eight segments 3, the radially outer surfaces of which are provided with V-grooves which define the base of the pulley groove.

The faces of the segments 3 adjacent the disc 1 are provided with bosses 4 which are slidably disposed within radial slots 2 in disc 1. The faces of the segments 3 adjacent the disc 5 are grooved to provide a plurality of teeth 7 which mesh with a spiral groove 6 provided on the inner face of the disc 5.

The disc 5 is axially movable on the hub 1' and abutting the disc 5 is a disc washer 8 keyed in a groove 9 of the hub 1' by a key 8', so that the disc washer 8 is axially movable but non-rotatably mounted. A nut 10 threaded as at 10' to the hub 1' clamps the disc 5 to the hub 1' and urges the discs 1 and 5 together thereby clamping the segments 3 therebetween. By loosening the nut 10, the disc 5 may be rotated about hub 1' to cause the segments 3 to move simultaneously radially outwardly or inwardly and thus alter the effective diameter of the pulley. The radial movement results from the segments 3 and disc 5 being threadably engaged, circumferential movement being prevented by the bosses 4 engaging the slots 2. After adjustment of the segments 3, the latter can be clamped in position once again by tightening the nut 10.

To ensure that the segments 3 remains in mesh with the spiral groove 6 of the disc 5, a stop disc 12 is fixed to the hub 1' by a stud 13 to prevent the nut 10 being moved axially by more than the axial depth of the spiral groove 6. It is merely intended to loosen the friction connection between the parts 1, 3 and 5, without permitting that the segments 3 leave the spiral groove 6.

The disc 1 is provided on its inner face with a resilient pad 14 of resilient material e.g. foam rubber or synthetic resin material covered by a thin metal sheet. The segments 3 abut the resilient pad 14 which accommodates any variation in size between the segments 3 and ensures that the segments 3 are tightly clamped between the discs 1 and 5. The resilient pad 14 also ensures that all the segments 3 are stressed equally, or substantially so, whereby, when the pulley is in operation, the tensile forces within the belt are distributed evenly between both discs 1 and 5, thus preventing overloading of the teeth 7 or of the spiral groove 6.

By providing two pulleys of the type described, a continuously variable transmission ratio can be provided in a belt drive.

It will be appreciated that the segments 3 need not be provided with V-grooves in their outer surfaces but could be flat, thereby providing a simple grooved pulley.

While I have disclosed one embodiment of the present invention, it is to be understood that this embodiment is given by example only and not in a limiting sense, the scope of the present invention being determined by the objects and the claims.

I claim:

1. A belt pulley of infinitely variable diameter, comprising
    a hub,
    two axially spaced discs mounted on said hub,
    one of said discs being fixed on said hub,
    the other of said discs being axially movable and rotatably mounted on said hub,
    a plurality of segments disposed between said two discs such that the outer surfaces of said segments define the base of the groove of said pulley,
    said hub being threaded at the end supporting said slidably mounted disc,
    a nut mounted on said threaded end of said hub and permitting pressing together said two discs and segments and clamping said segments between said discs,
    one of said two discs having a plurality of radial grooves or slots at least equal in number to that of said segments,
    the latter including bosses slidably disposed within said radial grooves or slots of said disc,
    the other of said two discs comprising at least one spiral groove disposed on the inner surface thereof, and
    said segments having on their surface opposite said inner face of said other disc bosses meshing with said spiral grooves of said other disc.

2. The belt pulley, as set forth in claim 1, which includes means preventing a movement of said axially movable disc from moving axially by more than the depth of said spiral grooves, whereby said segments and said threadably engaging disc are in permanent mesh.

3. The belt pulley, as set forth in claim 1, which includes a resilient pad disposed on the inner surface of said one of said discs for engagement with the adjacent opposite face of said segments.

4. The belt pulley, as set forth in claim 3, which includes a thin layer of sheet metal covering said elastic pad and engaging the adjacent opposite face of said segments.

References Cited by the Examiner
UNITED STATES PATENTS

| | | | |
|---|---|---|---|
| 601,660 | 4/1898 | Kirchhoff | 74—230.24 |
| 3,150,529 | 9/1964 | Walk | 74—230.19 |

DAVID J. WILLIAMOWSKY, *Primary Examiner.*

L. H. GERIN, *Assistant Examiner.*